United States Patent [19]
Williams

[11] Patent Number: 5,329,476
[45] Date of Patent: Jul. 12, 1994

[54] METHOD AND APPARATUS FOR EARLY QUOTIENT COMPLETION IN ARITHMETIC DIVISION

[75] Inventor: Ted Williams, Los Gatos, Calif.

[73] Assignee: HaL Computer Systems, Inc., Campbell, Calif.

[21] Appl. No.: 968,851

[22] Filed: Oct. 30, 1992

[51] Int. Cl.$^5$ .................................................. G06F 7/52
[52] U.S. Cl. .................................................. 364/761
[58] Field of Search ............... 364/761, 762, 763, 764

[56] References Cited

U.S. PATENT DOCUMENTS 4,011,439  3/1977  Bennett ........................... 364/761
4,460,970  7/1984  McClary ........................... 364/761

OTHER PUBLICATIONS

"A Zero-Overhead Self-Timed 160-ns 54-b CMOS Divider" by Ted E. Williams and Mark A. Horowitz, IEEE Journal of Solid-State Circuits, vol. 26, No. 11, pp. 1651-1661, Nov. 1991.

Primary Examiner—David H. Malzahn
Attorney, Agent, or Firm—Albert C. Smith

[57] ABSTRACT

Apparatus and methods for early quotient completion in arithmetic division include a quotient digit generator, one or more asynchronous shift registers and a remainder comparison block. As quotient digits are generated, each digit is transferred to a different asynchronous shift register in turn. Digits are immediately propagated down each shift register to the next most significant digit position. During propagation digits are also repeated at all lesser significant digit positions. At the end of a digit generation cycle, when all asynchronous shift registers have received one new digit, the remainder comparison block determines if the current remainder is the same as the last period's remainder. If not, the remainder comparison block sends a reset signal to all the shift registers, sending reset spacers along each register that reset all duplicate versions of the last digits sent. The registers are then ready to receive next period's series of quotient digits. If the remainders are the same, the remainder comparison block halts any further quotient digit generation. Connections from each cell of the shift registers are interleaved to produce a final quotient answer that is already both correctly aligned, and has all repeating digits available and in place.

20 Claims, 11 Drawing Sheets

METHOD AND APPARATUS FOR EARLY QUOTIENT COMPLETION IN ARITHMETIC DIVISION

BACKGROUND OF THE INVENTION

The present invention relates to arithmetic integrated circuits. In particular, the invention relates to apparatus for arithmetic division operations.

Many sophisticated microelectronic devices employ microprocessing devices. Microprocessors, whether for general purpose computers, or for specially configured signal processors and similar special-purpose devices, employ some form of arithmetic unit for calculating arithmetic operations. One of the most common arithmetic operations is the division of one number by another. The arithmetic operation of division, whether for integer or floating point operations, computes successive quotient digits. Unlike other arithmetic operations (such as addition or multiplication), in division the resulting quotient digits are always calculated from the most-signficant digit to the least significant. That is, dividing 100 by 5, one first finds that the quotient has a 2 in the 10's digit and, then finds a zero in the 1's digit (and zeroes in every successive digit).

Conventional arithmetic units usually generate each quotient digit sequentially, storing these digits temporarily until all of the digits are available as a final answer. Arithmetic units usually store these digits in a shift register designed to shift previous digits as each new digit is formed. The shift register can deliver a final quotient answer only when all of the digits have been generated to the required precision.

Division, especially for high-precision applications, can be enormously time-consuming. However, it is well known that sequences of quotient digits will repeat when the dividend and the divisor form a rational fraction. This feature of division makes some form of time savings feasible, in theory, by detecting this repetition early and halting the calculation process. Yet current arithmetic hardware does not implement such early detection. The complete series of calculations are always performed because it would take just as much area and time delays to add additional logic to replicate a repeating series of digits and to steer the digits to their correctly aligned positions. Because no perceived time-savings has been demonstrated, designers of conventional arithmetic units have not bothered to incorporate any apparatus to detect repeating quotient digit series. Therefore, most division apparatus has a constant time delay independent of operands. For example, to compute a 53-bit answer to ½ normally takes just as long as to compute the 53-bit answer to 1/7.

Current microelectronic technology methods and apparatus do not provide a simple, time-saving means for detecting patterns of repeating quotient digits, and for terminating division processes early. What is needed is an improved method and apparatus for detecting quotient repetition, and for completing quotients early. The improved apparatus and method should provide a simply implemented system for discovering quotient repetitions without adding inordinate hardware and delay overhead. The apparatus and method should be sufficiently flexible to implement the early repetition detection and quotient completion with a variety of hardware platforms, logic architectures and system requirements.

SUMMARY OF THE INVENTION

In accordance with the present invention, apparatus and methods for early quotient completion in arithmetic division include a quotient digit generator for generating a sequence of quotient digits, one or more quotient digit storage memories having a plurality of linked storage locations for storing a series of the generated quotient digits, where each quotient digit storage memory stores a series of quotient digits kept constantly most-significant-bit aligned, and a remainder comparator for determining if and when the quotient starts repeating.

As each quotient digit arrives at a respective quotient digit storage memory, the new digit is immediately propagated down its respective linked storage locations, and is duplicated at all reset storage locations up to the last reset storage location. The number of quotient digit storage memories determines the period of the digit accumulator. Once a full set of quotient digits have entered and filled the set of quotient digit memories, a given period has completed. At the end of each period, the remainder comparator determines whether the same remainder exists as at the end of the last period. If the remainder is not the same, the remainder comparator sends a reset signal to each of the storage memories, causing parallel reset spacers to be sent along the linked storage locations, resetting all storage locations up to the last set of digits. These reset spacers operate to allow a new set of digits to flow down the linked storage locations, up to the last new digit sent down each quotient digit storage memory. If the new remainder is the same as last period's remainder, the quotient is known to repeat, and no reset signal is sent so that no storage areas are reset. The processing concludes, since the stored values in these locations are already correct.

If there are more than one quotient digit storage memories, quotient digits are delivered to each memory sequentially round-robin. The quotient generation continues until the remainder comparator determines that the remainder left over after a division step has repeated, or the registers are filled with quotient digits to the desired precision. If the remainder has repeated, quotient processing halts without recomputing less significant digits, since they would be just the same as those currently in the storage memories. The final answer for the division operation can then be delivered, including all repeated quotient digits, by interleaving the quotient digits stored in the collection of quotient digit storage memories. This answer is already properly aligned by its most significant bit (MSB), is complete to its full precision, and automatically provides any repeated quotient digits. In the preferred embodiment, the quotient digit storage memories comprise asynchronous shift registers that allow the propagation of each quotient digit immediately to its correctly aligned position (while duplicating it at less-significant bit locations). This automatic alignment improves upon conventional synchronous shift registers that require a fixed number of clocks to align the bits. The present invention allows early detection of repeated quotients because the unique shift registers keep the most significant bits of the quotient correctly aligned and because the shift registers automatically duplicate the last digit just in case it in fact repeats.

The present invention provides a simple, elegant means for detecting repeated quotient digits, halting division processing early, and providing an already aligned, completely filled, fully precise quotient. Depending on the number of quotient digit storage memories employed, different repeating periods can be detected. The current methods and apparatus of the present invention can be implemented in a variety of architectures, and with any fabrication techniques. The powerful, flexible system for accumulating and automatically repeating quotient data provided by the present invention allows designers to easily implement time savings into arithmetic units with relatively little area overhead. These and other features and advantages of the present invention are apparent from the description below with reference to the following drawings.

DESCRIPTION OF THE PREFERRED EMBODIMENTS

Figure 1:
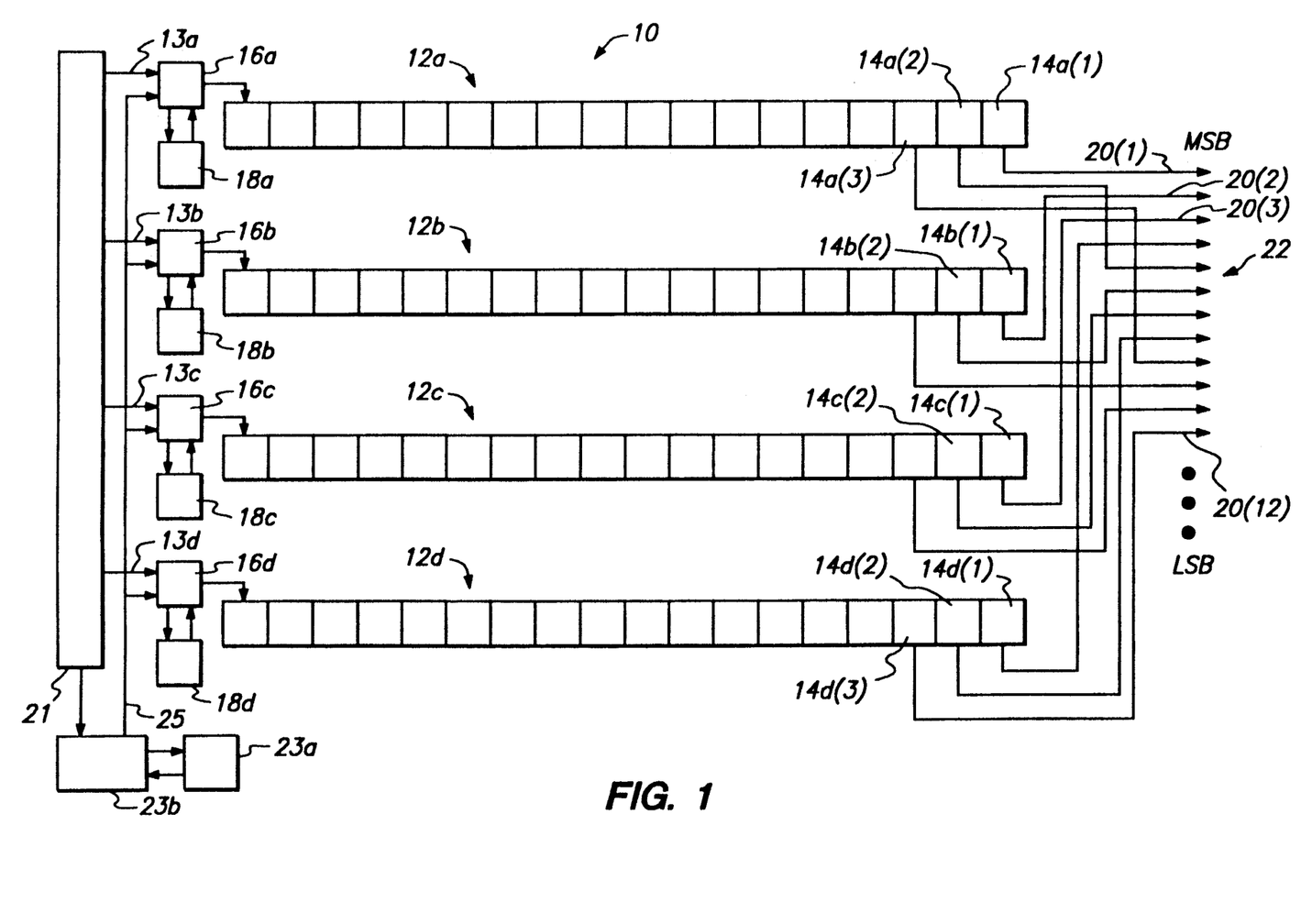
FIG. 1 shows a block diagram of a group of four asynchronous shift registers in accordance with the present invention.

In accordance with the present invention, apparatus 10 for early quotient completion in arithmetic division is shown in FIG. 1. A series of asynchronous shift registers 12a, 12b, 12c and 12d are connected by respective connections 13a, 13b, 13c and 13d from a plurality of quotient digit generators 21. Each asynchronous shift register 12 comprises a series of linked cells or storage areas 14a(1) (storing the most significant bit), 14a(2) (storing the next most significant bit) and so on. Each asynchronous shift register 12 can also have a respective quotient digit comparator 16 and a last quotient digit storage memory 18. Interleaved output wires 20 from each cell 14 of each shift register 12 provide the final answer 22 from the device. In the present embodiment four shift registers 12 are employed, thus the output wires 20 cycle through four sets of cells:

| Cell | Output Wire |
|---|---|
| 14a(1) | 20(1) |
| 14b(1) | 20(2) |
| 14c(1) | 20(3) |
| 14d(1) | 20(4) |

| Cell | Output Wire |
|---|---|
| 14a(2) | 20(5) |
| 14b(2) | 20(6) |
| 14c(2) | 20(7) |
| 14d(2) | 20(8) |

The preferred embodiment uses asynchronous shift registers to store the quotient digits as they are completed. These asynchronous shift registers provide two principal features of the present invention: the registers keep the most significant quotient bit constantly aligned (in cell 14a(1)) and the registers automatically replicate quotient digits even before being needed.

For the invention to function properly, the quotient digits must be encoded in a self-completion indicating format. The simplest such format is just "one-hot" or "n-monotonic," meaning that one wire is used for each of the n possible values for each quotient digit. For example, for a radix-2 divider, where each quotient digit has three possibilities ($-1$, 0, $+1$), the digit can be represented on three wires. If any of the wires is high, the quotient digit has the value corresponding to that wire; if none of the wires are high, the set of wires indicate a reset state, indicating that the quotient digit is not yet ready. The wires return to the reset state between the transmission of each quotient digit. This operation is a novel extension of the dual-monotonic signaling as found in U.S. Pat. No. 3,290,511.

Figure 2:
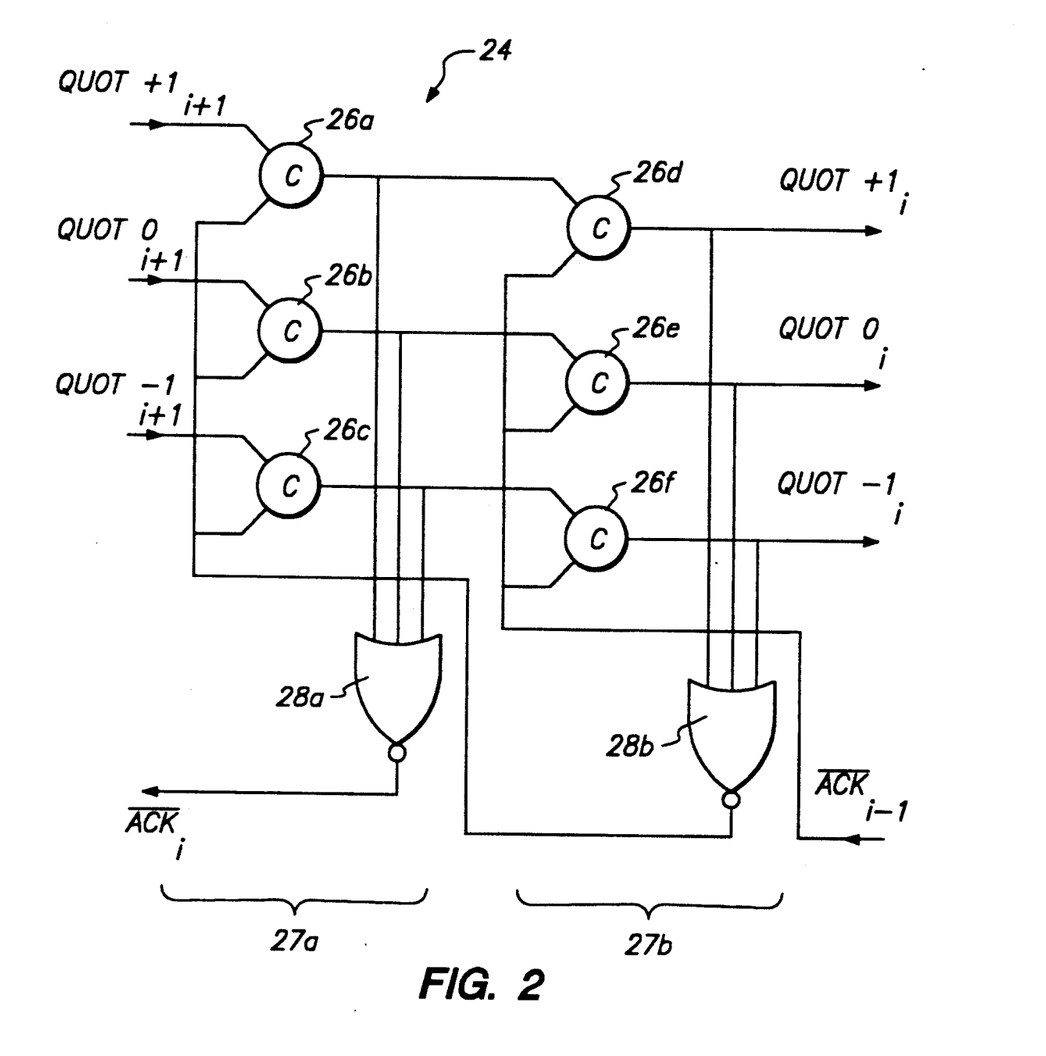
FIG. 2 shows a cell of a three-wire asynchronous shift register of the present invention.
Figure 3A:
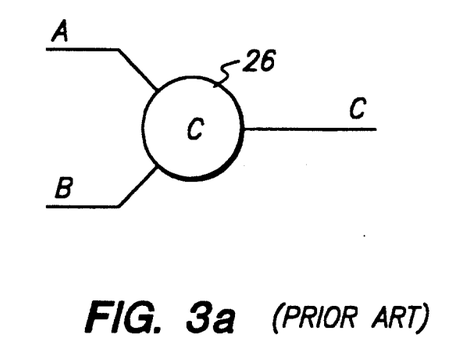
FIG. 3a and 3b shows a Muller-C element and its schematic representation as used in the three-wire asynchronous shift register of FIG. 2.
Figure 3B:
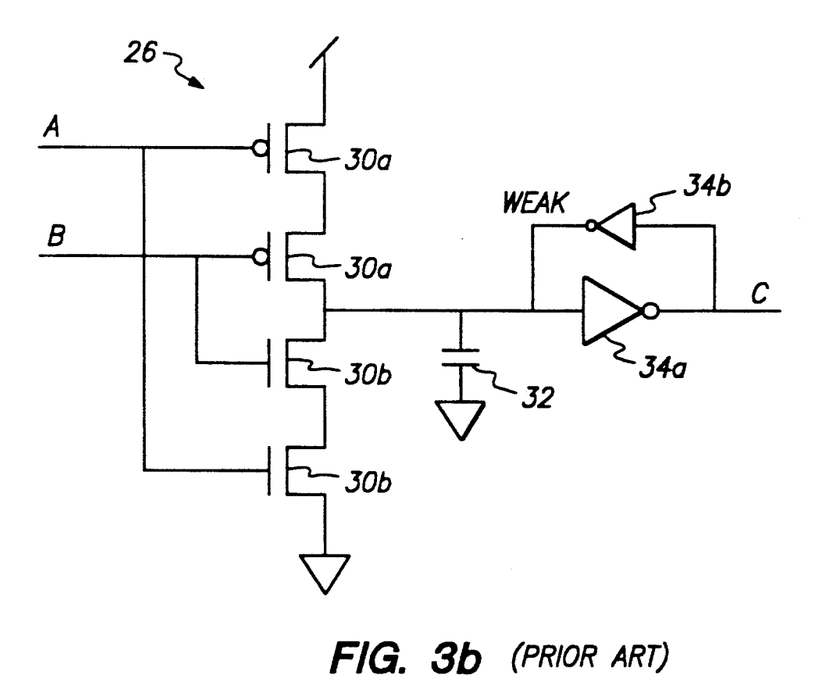

FIG. 2 shows a basic cell 24 of an asynchronous shift register 12 used by the present invention. (Although U.S. Pat. No. 4,058,773 also discloses an asynchronous shift register, the present invention is more efficient for n-monotonic signals. Furthermore, the present invention uses the shift registers to perform a serial-to-parallel conversion directly.) The arrows indicate the direction of signal flow, from left to right, being latched by the 2 sets of three Muller-C cells. Two NOR gates 28a and 28b complement these Muller-C cells to provide the cell resetting operations required by the present invention. FIGS. 3A and 3B illustrate diagrammatically and schematically the construction of a conventional Muller-C cell. The operation of Muller-C cells is well known in the art, and is summarized in the following truth table:

| A | B | C |
|---|---|---|
| 1 | 1 | 1 |
| 0 | 0 | 0 |
| 1 | 0 | previous C |
| 0 | 1 | previous C |

The storage cell 24 implements the triple-monotonic format discussed above for a radix-2 divider: therefore if the input $Quot+1_{i-1}$ wire is high, the output $Quot+1_i$ will be high (and all other inputs and outputs will be low). The asynchronous shift registers of the present invention are constructed by ganging the storage cell 24 in a series, where the left-hand $ACK_i$ of the ith cell connects to the right-hand $ACK_{i-1}$ of the (i+1)th cell, and the Quot lines are similarly connected. The cells are constructed to allow the packing of new digits up to the last new digit, by alternating the transmission of digits and spacers. A digit is represented by one of the three lines being high; a spacer is represented if all lines are low. Initially, a new digit will pack both sides 27a and 27b of the storage cell. The next reset spacer, however, will fill the left hand side 27a and prevent any new digits from overwriting the old one. This results because a digit in the right hand side 27b causes the output of the NOR gate 28b to be low, indicating that none of the Muller-C cells 26a, 26b, or 26c will be enabled for a new digit, only a new spacer. Then the reset spacer stops any new digit from overriding the previous last new digit.

Figure 4:
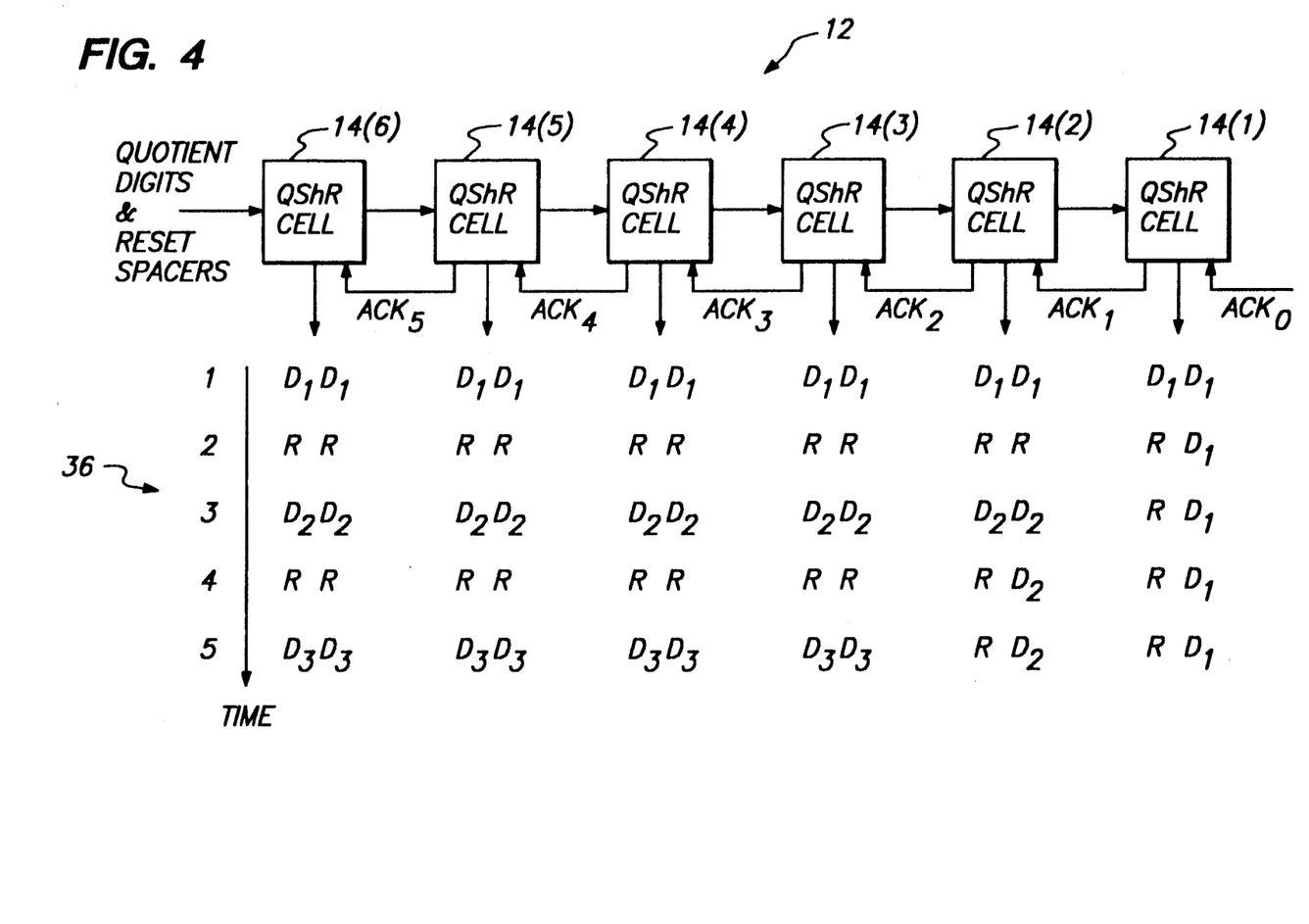
FIGS. 4 shows a block diagram of an asynchronous shift register and its function through time in accordance with the present invention.

FIG. 4 illustrates this operation for a portion of one of the asynchronous shift registers 12 of the present invention, comprising a linked series of storage cells 14(1) through 14(6). Each of these storage cells 14 (or quotient shift register cells) can be constructed from the storage cell 24 depicted in FIG. 2. Quotient digits D (represented by one of the three wires going high) and reset spacers R enter the shift register 12 from the left and are propagated along the shift register automatically from left to right, because the shift registers are asynchronous. The digits therefore immediately propagate down towards the most-significant end to their final resting place in the shift register. There is no need to clock the shift register and, importantly, no need to wait for a fixed number of clocks until the digits get aligned to their final positions.

The series of rows 36 of letters below the shift register illustrate the operation of the shift register through time. At each location, the two letters indicate what is being stored in the left and right halves, 27a and 27b, of each storage cell 24. At time 1, a first digit $D_1$ has propagated down the shift register 12, filling all halves at each storage location. Because the shift register is initialized with all locations being reset, all ACK signals are high, allowing each cell to latch a new digit. In terms of nomenclature, at time 1, $D_1$ in the first cell 14(1) is the shift register's most significant bit; all other $D_1$'s are its duplicates. At time 2, the digit is followed by a reset spacer R. The spacer resets all digits but the MSB, as shown by the Rs. The reset spacer does not reset the last, most significant bit, because the first ACK signal, $ACK_0$ is kept initialized at high. Thus, no reset signal (being all low signals) can be latched into the right half 27b of the first cell, 14(1). At time 3, a second digit $D_2$ follows, filling in all the reset storage cells, except for the last one, since having a digit in the right half of cell 14(1) means the output of NOR gate 28b is low: thus only a reset spacer and not a digit can be latched into the left half of cell 14(1). Again, the first $D_2$ in second cell 14(2) is the next-most significant bit of the shift register, and all other $D_2$'s are its duplicates. At time 4, another reset spacer is sent, which again resets all the cells 14 up to the newest digit $D_2$ in cell 14(2). That digit is also not reset because the acknowledge signal $ACK_1$ (due to the reset spacer in the right half of 14(1)) is still high, and allows only a digit and not a reset spacer to be latched into the right half of cell 14(2). At time 5, the process repeats again, and the third digit $D_3$ is propagated down the shift register, filling all the reset storage cells, except for the left reset portion of cell 14(2), because a digit in the right half allows only a reset spacer to be latched in the left half. Thus, the shift registers 12 of the present invention are designed to automatically replicate quotient digits because they fill the bits of lesser significance as the digits flow down the channel. During invention operation, these duplicated digit areas get reset spacers (in preparation for the next quotient digit) only when the system determines that the new digit may not be the same as the old digit (that is, when the remainder after one period differs from the previous remainder).

Figure 5:
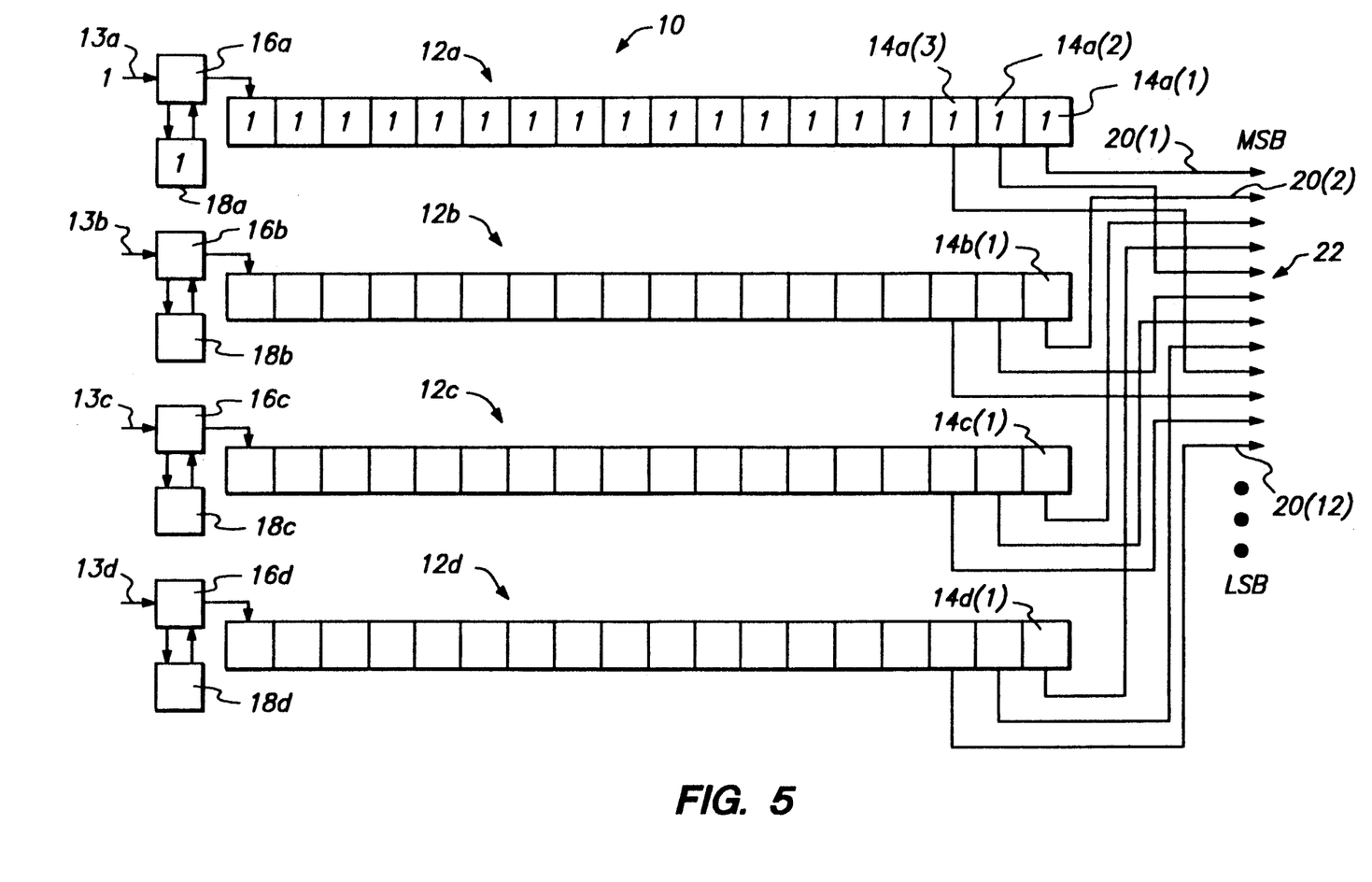
FIG. 5 illustrates the operation of the present invention in loading a shift register with a quotient digit by propagation and duplication.

FIGS. 5 through 8 illustrate how the preferred embodiment of four asynchronous shift registers 12 cooperate in the present invention to produce a final output quotient. As shown in FIG. 5, an initial digit (1) enters along connection 13a to the first shift register 12a. (Throughout this explanation, normal decimal digits are shown to more easily explain invention operation. As discussed above, the present invention actually implements a radix-2 convention, and those skilled in the art will realize that these same methods can be applied to any division radixes. The present illustration calculates the answer to "41/33" whose answer is "1.242424," where the repeating decimal digits have a period of 2. The quotient digits can be calculated by any convenient calculation apparatus 21; one such apparatus and method is disclosed in U. S. Pat. No. 5,121,003, hereby incorporated by reference). The first MSB digit "1" is propagated along the shift register 12a, duplicated in all empty cells. Further, the digit is stored in the last quotient digit storage memory 18a.

Figure 6:
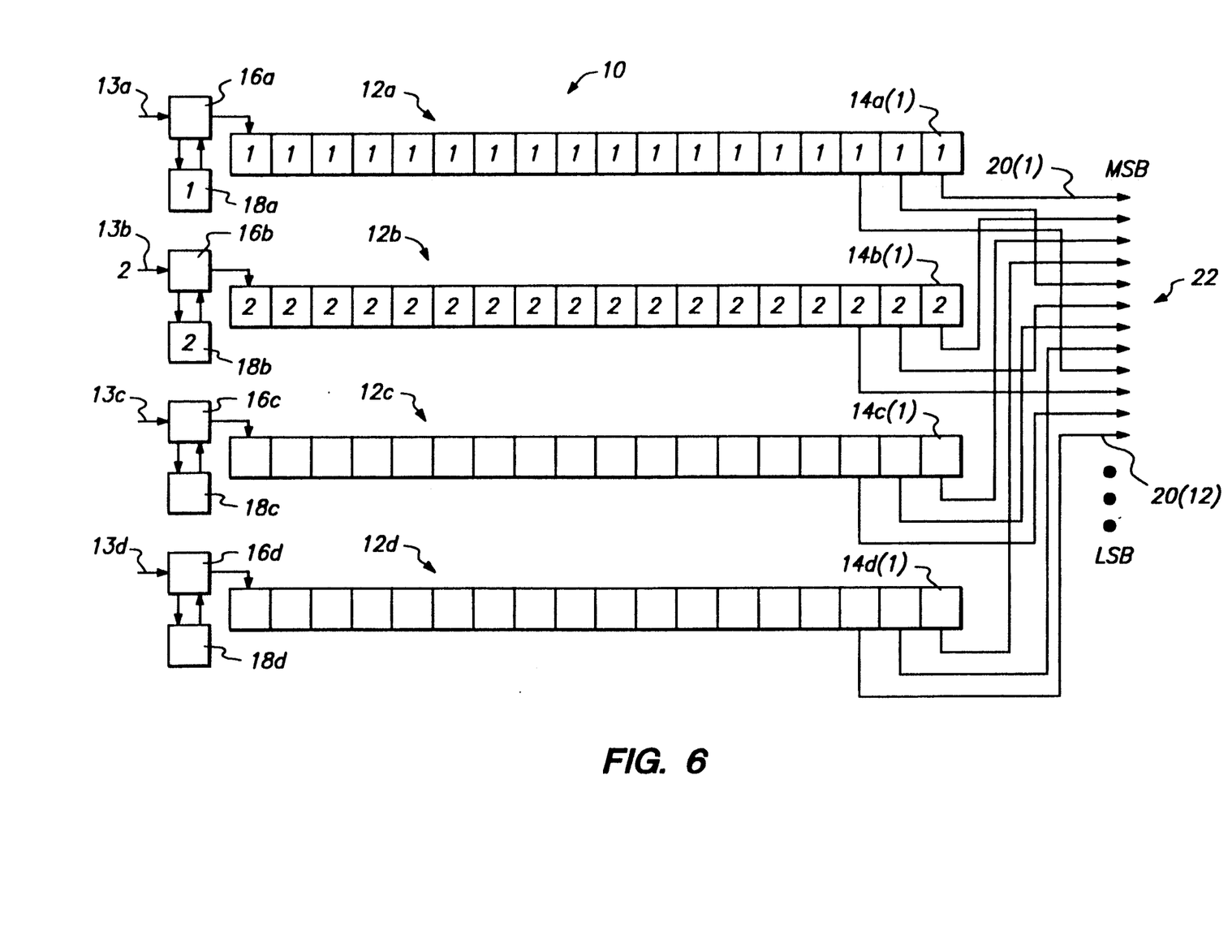
FIG. 6 illustrates the operation of the present invention in loading a shift register with a quotient digit by propagation and duplication.
Figure 7A:
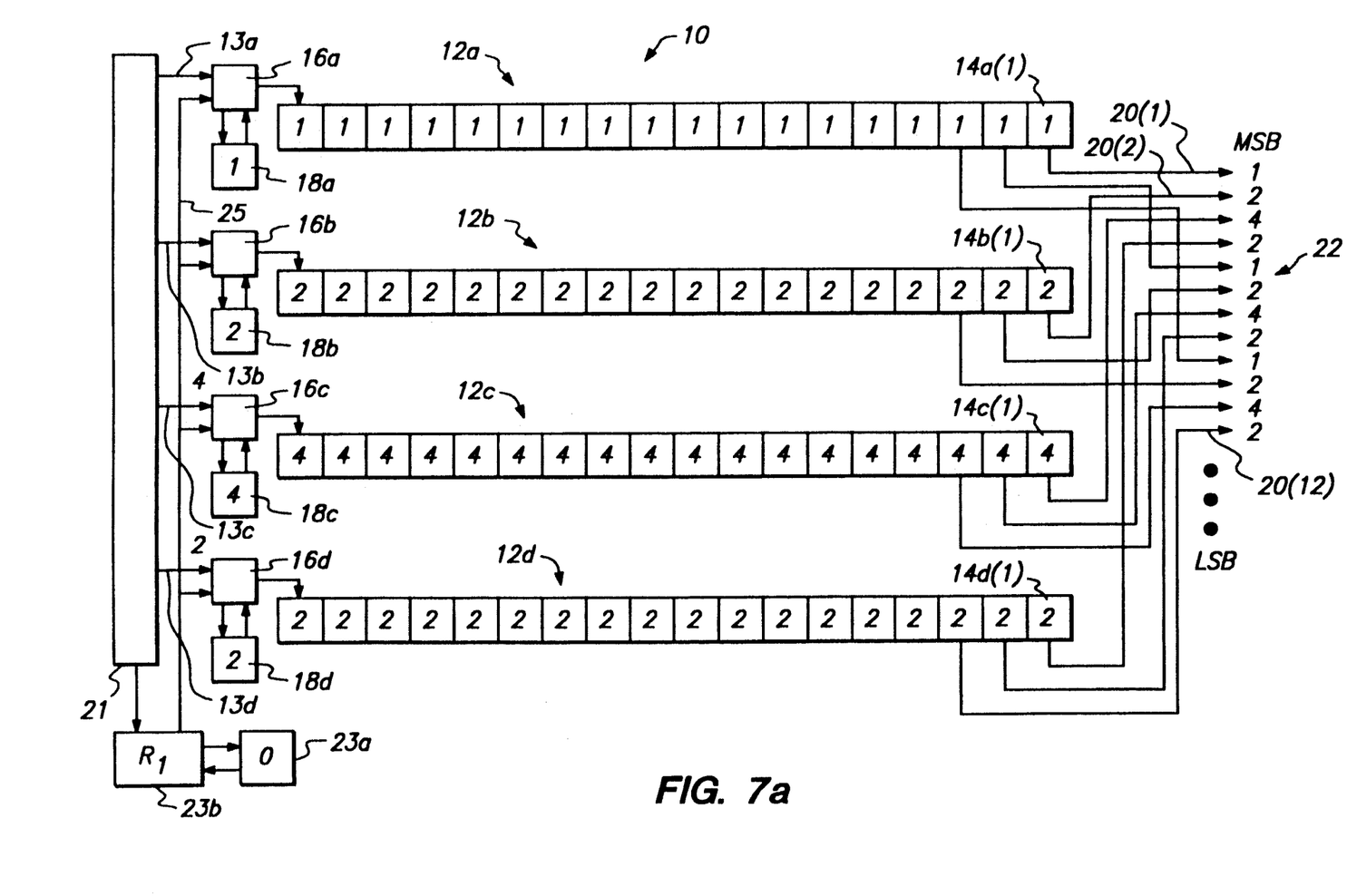
FIG. 7a illustrates the operation of the present invention in loading a shift register with quotient digits by propagation and duplication.
Figure 7B:
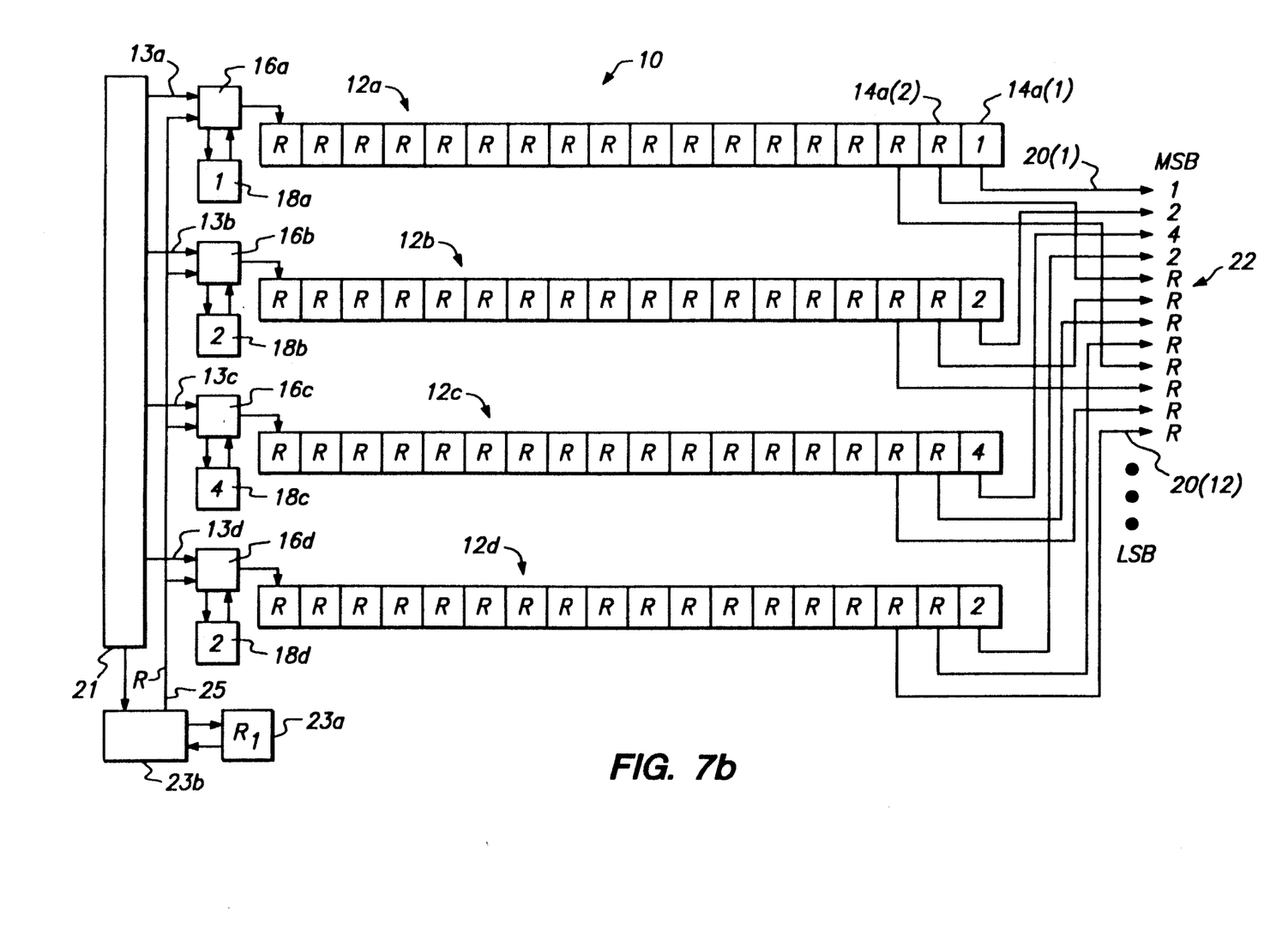
FIG. 7b shows the resetting of all shift registers of present invention.

FIG. 6 shows the next digit "2" being likewise propagated along shift register 12b, and stored in last quotient digit storage memory 18b. Similarly, FIG. 7a shows the third "4" and fourth "2" digits being propagated along shift registers 12c and 12d respectively, and stored in respective last quotient digit storage memories 18c and 18d. At this point, all cells 14 in the shift register matrix are filled, and a quotient result 22 is available. However the quotient result is wrong, in that the "1" digit is incorrectly repeated through result. Result 22 currently reads: "1.24212421," when the correct answer should be "1.24242424." FIG. 7a shows the remainder comparison that occurs at the end of each period. Since this is the first period, though, the current remainder $R_1$ is different from the null remainder $\phi$ that initialized the device on start-up. Since the remainders differ, the remainder comparator 23b sends a reset signal to each shift register along signal line 25, and the current remainder $R_1$ is stored in remainder register 23a, as shown in FIG. 7B. The reset signal causes a reset spacer to propagate down each asynchronous shift register 12, stopping, as discussed above in FIG. 4, at the last digit cell 14(1) of each shift register 12. (For all the FIGS. 5 through 8, the digits or spacers shown in cells 14 are those existing in the right hand side of each cell, i.e., the side that actually gets output along output wires 20).

Figure 8A:
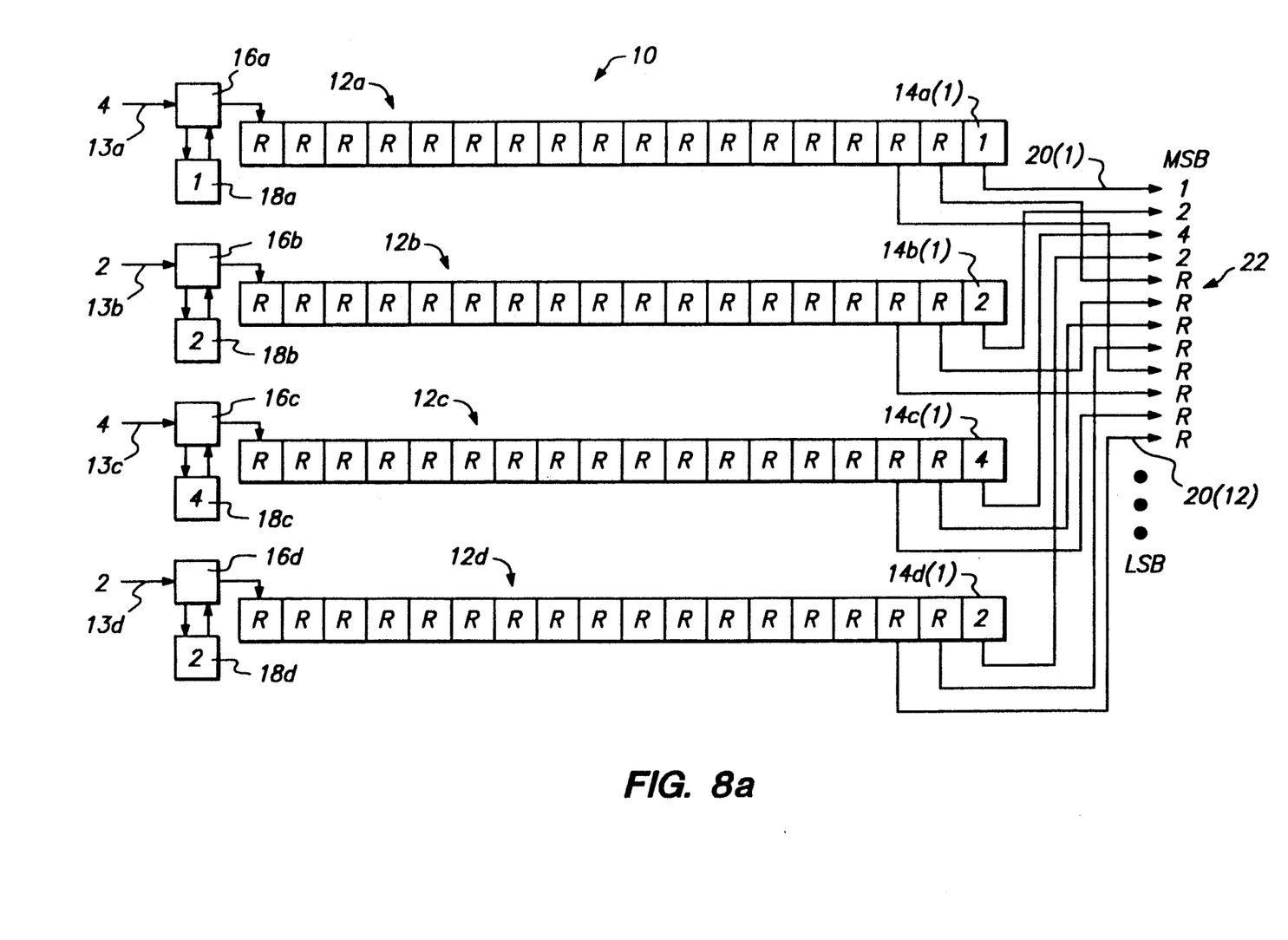
FIGS. 8a, 8b and 8c illustrate the operation of the present invention by propagating new quotient digits to reset areas and comparing the new remainder with the old remainder, when quotient duplication occurs, processing stops and a final quotient answer is made available.
Figure 8B:
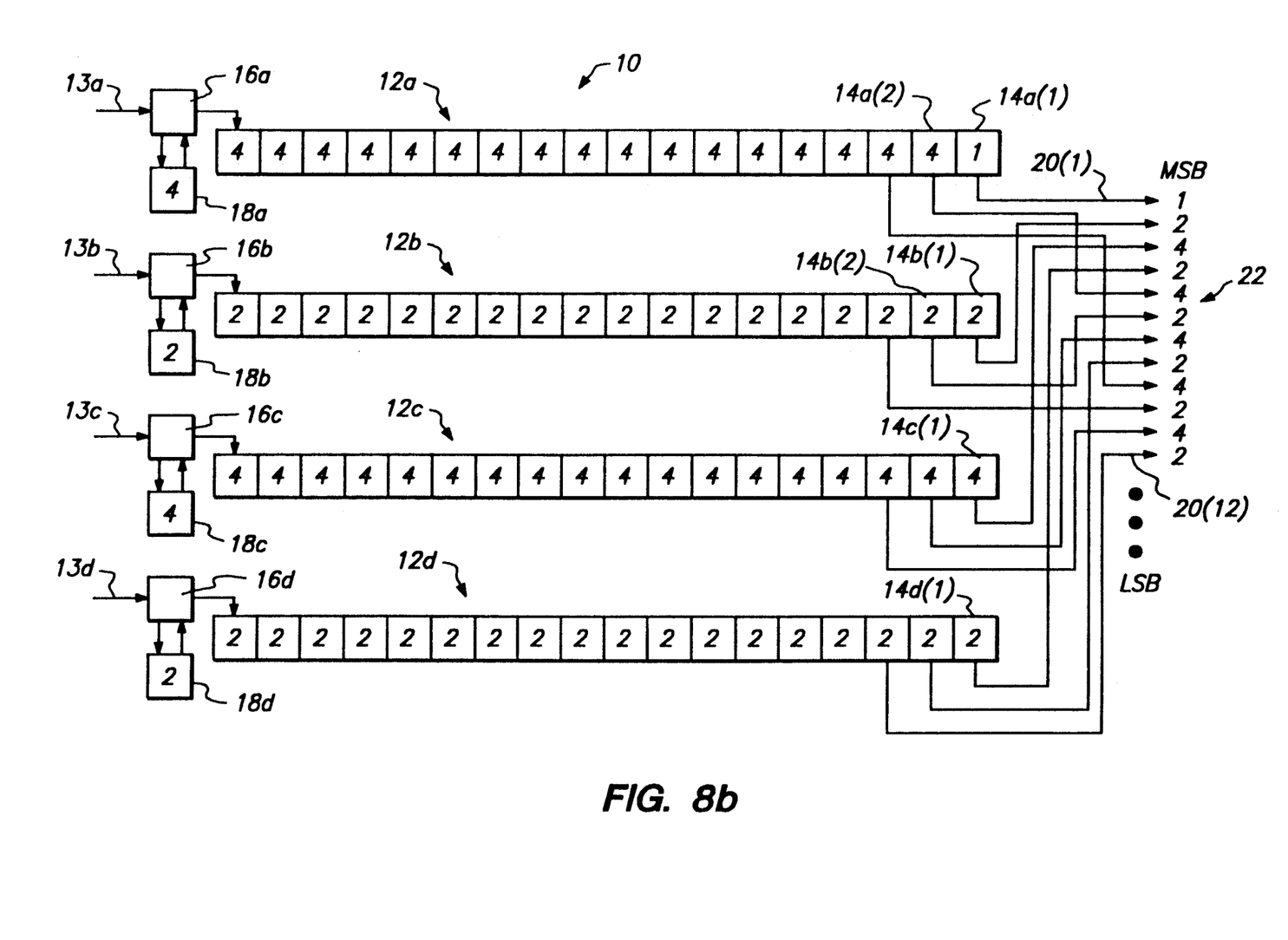
Figure 8C:
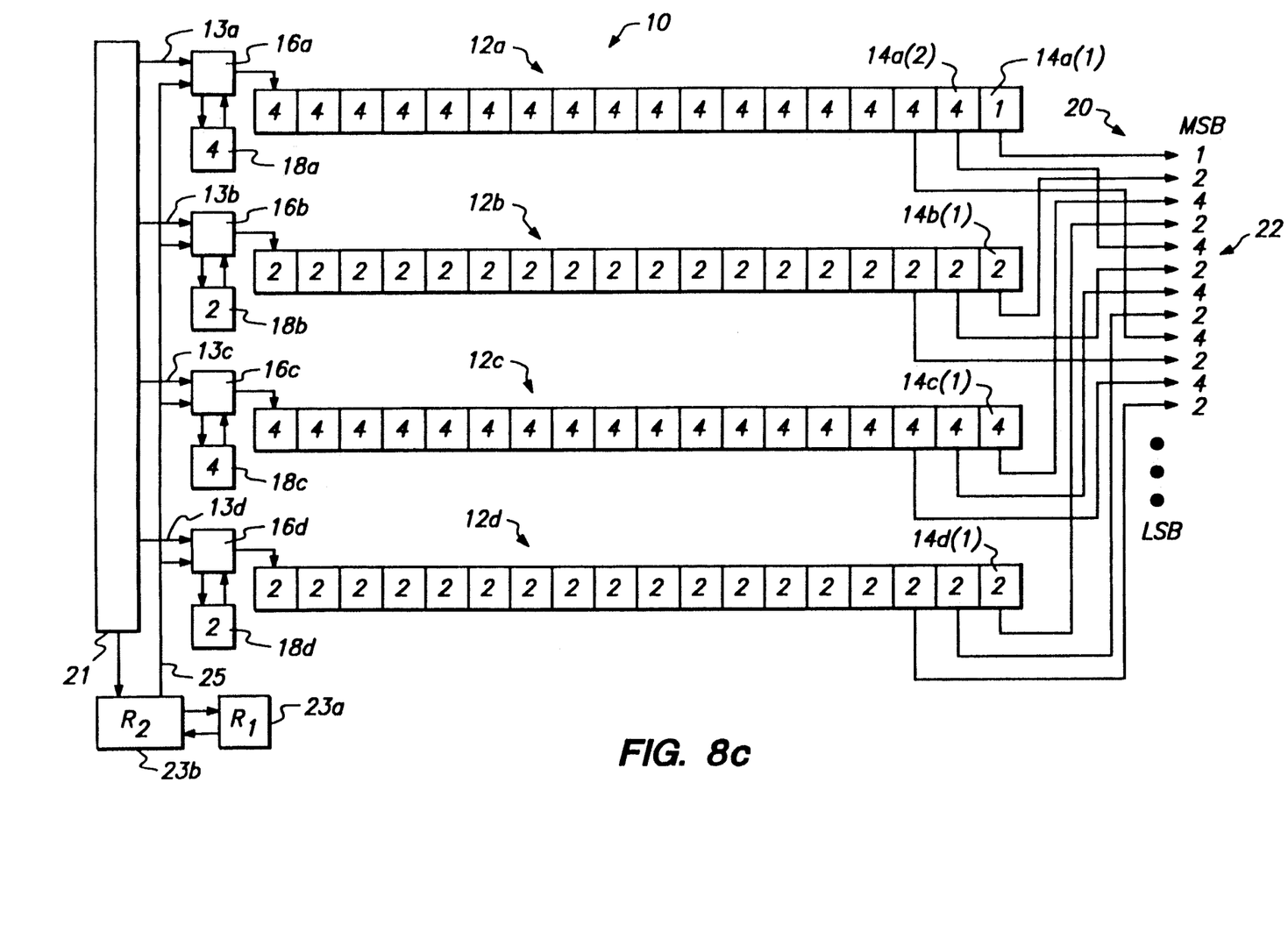

FIGS. 8a through 8c show the next set of operations as a new period of four quotient digits arrive at the shift registers 12a through 12d. In FIG. 8a, four new digits have arrived ("4", "2""4" and "2"). Clearly, the quotient has begun to repeat, and the remainder in this period will be the same as the remainder that was found at the end of the last period. In FIG. 8b, since reset spacers have already been propagated, the new digits automatically propagate to their appropriate spots. In FIG. 8c, the remainder comparator 23b compares the remainder $R_1$ stored in remainder register 28a with the new remainder $R_2$. Since these are now the same, the remainder comparator does not send a reset signal to all four shift registers 12. Instead, the answer that exists in in the four shift registers represents the final answer for the quotient. Once this event occurs, the divider ceases operation, and the resulting quotient 22 can be output as the correct answer.

The bits of the four shift registers are interleaved, as explained above, so that wires 20(1), 20(2), etc. provide the correct final output quotient. Using the present scheme, quotient digits are automatically replicated for repeating cycles of either 4, 2 or 1 digits (the factors of the shift register group size). As those skilled in the art will recognize, any number of shift registers 12 can be used to implement this invention, allowing different repeating periodicities to be detected early. The present implementation was chosen since these periodicities are usually the most frequently calculated. In particular, any even division result will have a number of repeated zeroes or minus ones (of period 1) that the present invention will detect early and not need to completely calculate.

As can be seen from the above discussion, the asynchronous shift registers of the present invention allow the quotient digits to be kept in constant alignment. Because the digits are immediately propagated down respective shift registers, the MSB of the first shift register will always contain the MSB of the quotient result. Moreover, the retention of duplicates of the propagated quotient digit allows the invention to immediately produce the completed quotient, when the device detects that both the remainder and quotient digits have repeated. Delaying the transmission of reset spacers (until the comparators determine that the new quotient digit is different from the old quotient digit) enables this retention of quotient digit duplicates along each shift register.

As an alternative embodiment, each shift register 12 can locally determine whether the new quotient digit is the same as the last quotient digit stored in quotient digit storage location 18, by comparing them in the quotient digit comparators 16. If they are not the same, a reset spacer can be sent locally along the respective shift register 12. The remainder comparison block 23a and 23b can include remainder registers for each shift register: if the remainder is the same when an identical quotient digit has been sent to that register, the processing can conclude. This would allow a repeating quotient to be detected slightly sooner instead of waiting for the end of the period. The output of the quotient, along with duplicated digits, would then be the same as described above.

While the present invention has been described with reference to preferred embodiments, those skilled in the art will recognize that various modifications may be provided. For example, a different radix for representing quotient digits can be used, instead of the ($-1$, 0, $+1$) digits for radix 2. Also different storage means for storing successive quotient digits can be used instead of the asynchronous shift registers described above. A number of equivalent apparatus can be used to implement the present invention. Any number of shift registers can be used, to detect different repetition periods, and these shift registers can have any number of cells, to provide answers of different precision. These and other variations upon and modifications to the described embodiments are provided for by the present invention, the scope of which is limited only by the following claims.

What is claimed is:

1. Apparatus for computing repeating quotient digits during a division process in a divider, comprising:
   quotient digit generating means for generating a succession of quotient digits;
   at least one quotient digit storage means for storing a series of the generated quotient digits, each quotient digit storage means coupled to the quotient digit generating means for receiving the quotient digits, each quotient digit storage means including a linked plurality of storage areas having a most significant reset storage area and lesser significant reset storage areas, the quotient digit storage means propagating and storing a last received quotient digit along the linked plurality of storage areas to the most significant reset storage area, the propagation duplicating and storing the last received quotient digit at the lesser significant reset storage areas; and
   remainder comparison means coupled to the quotient digit generating means for receiving a current remainder of the division process and for determining when the current remainder has repeated, the remainder comparison means further coupled to each quotient digit storage means for resetting the storage areas of all quotient digit storage means containing duplicates of the last received quotient digit, when the current remainder differs from a previous remainder; the remainder comparison means terminating quotient digit generation by the quotient digit generation means upon determining that the current remainder has repeated; the quotient digit storage means, upon quotient digit generation termination, providing a final quotient including quotient digits stored in all quotient digit storage areas.

2. The apparatus as recited in claim 1 having at least two of the quotient digit storage means.

3. The apparatus as recited in claim 1 having at least four of the quotient digit storage means.

4. The apparatus as recited in claim 1 wherein each of the quotient digit storage means further comprises an asynchronous shift register.

5. The apparatus as recited in claim 4 wherein each asynchronous shift register stores a 3-monotonic quotient digit from the quotient digit generating means.

6. The apparatus as recited in claim 4 wherein each asynchronous shift register maintains the most significant quotient digits constantly aligned as each of the quotient digits is propagated.

7. Apparatus for computing repeating digits in a divider, comprising:
   a quotient digit generator that generates a succession of quotient digits;
   at least one quotient digit storage memory that stores a series of the generated quotient digits, each quotient digit storage memory coupled to the quotient digit generator for receiving the quotient digits, each quotient digit storage memory including a linked plurality of storage areas having a most significant reset storage area and lesser reset significant storage areas, the quotient digit storage memory propagating and storing a last received quotient digit along the linked plurality of storage areas to the most significant reset storage area, the propagation duplicating and storing the last received quotient digit at the lesser significant reset storage areas; and
   a remainder comparator coupled to the quotient digit generator for receiving a current remainder of the division process and for determining when the current remainder has repeated, the remainder comparator further coupled to each quotient digit storage memory for resetting the storage areas of all quotient digit storage memories containing duplicates of the last received quotient digit, when the current remainder differs from a previous remainder; the remainder comparator terminating quotient digit generation by the quotient digit generator upon determining that the current remainder has repeated; the quotient digit storage memories, upon quotient digit generation termination, providing a final quotient including quotient digits stored in all quotient digit storage areas.

8. The apparatus as recited in claim 7 having at least two quotient digit storage memories.

9. The apparatus as recited in claim 7 having at least four quotient digit storage memories.

10. The apparatus as recited in claim 7 wherein each quotient digit storage memory further comprises an asynchronous shift register.

11. The apparatus as recited in claim 10 wherein each asynchronous shift register stores a 3-monotonic quotient digit from the quotient digit generator.

12. The apparatus as recited in claim 10 wherein each asynchronous shift register maintains the most significant quotient digits constantly aligned as each of the quotient digits is propagated.

13. A method for terminating computations of repeating quotient digits early in a divider, the method comprising the steps of:
 (a) generating a quotient digit and a current remainder;
 (b) transmitting the generated quotient digit to a quotient digit storage memory having a linked plurality of storage areas including a most significant reset storage area and lesser significant reset storage areas;
 (c) propagating the generated quotient digit along the linked plurality of storage areas, storing the quotient digit at the most significant reset storage area, and duplicating the received quotient digit at the lesser significant reset storage areas;
 (d) repeating steps (a) through (c) for a number of times equal to the number of quotient digit storage memories;
 (e) comparing the current remainder with a previous remainder;
 (f) resetting the storage areas of all quotient digit storage memories containing duplicates of a last received quotient digits, and repeating steps (a) through (e), when the current remainder differs from the previous remainder, and saving the current remainder as the previous remainder;
 (g) terminating quotient digit generation when the current remainder is the same as the previous remainder; and
 (h) providing a quotient including quotient digits from all of the storage areas of all the quotient digit storage memories, upon termination of quotient digit generation.

14. The method as recited in claim 13 having at least two quotient digit storage memories.

15. The method as recited in claim 13 having at least four quotient digit storage memories.

16. The method as recited in claim 13 wherein each quotient digit storage memory further comprises an asynchronous shift register.

17. The method as recited in claim 16 wherein each asynchronous shift register stores a 3-monotonic quotient digit.

18. The method as recited in claim 16 wherein each asynchronous shift register maintains the most significant quotient digits constantly aligned as each of the quotient digits are propagated.

19. Apparatus for computing repeating digits in a divider, comprising:
 a quotient digit generator for generating a succession of quotient digits;
 at least one quotient digit storage memory for storing a series of the generated quotient digits, each quotient digit storage memory coupled to the quotient digit generator for receiving the quotient digits in a current division process, each quotient digit storage memory including a linked plurality of storage areas having a most significant reset storage area and lesser reset significant storage areas, the quotient digit storage memory propagaging and storing a quotient digit along the linked plurality of storage areas to the most significant reset storage area, the propagation duplicating and storing the quotient digit at the lesser significant reset storage areas;
 a last quotient digit storage memory coupled to the quotient digit generator for receiving and storing a last received quotient digit from a previous division process;
 a quotient digit comparator coupled to the last quotient digit storage memory and a lesser significant reset storage area for comparing the last received quotient digit from a previous division process and a quotient digit from the current division process, and resetting the storage areas of all quotient digit storage memories containing duplicates of the quotient digit, when the quotient digit differs from the last received quotient digit; and
 a remainder comparator coupled to the quotient digit generator for receiving a current remainder of the division process, for determining when the current remainder has repeated, the remainder comparator terminating quotient digit generation by the quotient digit generator upon determining that the current remainder has repeated; the quotient digit storage memories, upon quotient digit generation termination, providing a final quotient including quotient digits stored in all quotient digit storage areas.

20. A method for terminating computations of repeating quotient digits early in a divider, the method comprising the steps of:
 (a) generating a current quotient digit and a current remainder;
 (b) transmitting the current quotient digit to a quotient digit storage memory having a linked plurality of storage areas including a most significant reset storage area and lesser significant reset storage areas;
 (c) propagating the current quotient digit along the linked plurality of storage areas, storing the current quotient digit at the most significant reset storage area, and duplicating the current quotient digit at the lesser significant reset storage areas;
 (d) repeating steps (a) through (c) for a number of times equal to the number of quotient digit storage memories;
 (e) comparing the current quotient digit with a previous quotient digit from a previous division process;
 (f) resetting the storage areas of all quotient digit storage memories containing duplicates of the current quotient digit, and repeating steps (a) through (e), when the current quotient digit differs from the previous quotient digit, and saving the current quotient digit as the previous quotient digit,;

(g) comparing the current remainder with a previous remainder;

(h) terminating quotient digit generation when the current remainder is the same as the previous remainder, otherwise storing the current remainder as the previous remainder; and (i) providing a quotient including quotient digits from all of the storage areas of all the quotient digit storage memories, upon termination of quotient digit generation.

* * * * *